United States Patent
Meitl

[15] 3,693,774
[45] Sept. 26, 1972

[54] MATERIAL UNLOADING SYSTEM
[72] Inventor: Harold G. Meitl, Clarendon Hills, Ill.
[73] Assignee: International Harvester Company, Chicago, Ill.
[22] Filed: Jan. 22, 1971
[21] Appl. No.: 108,835

[52] U.S. Cl..................193/17, 193/5, 214/38 R, 298/7, 298/23 S, 298/38
[51] Int. Cl............................................B65g 11/12
[58] Field of Search........214/38 R, 41, 42 R, 44, 58, 214/63; 298/7, 23 R, 23 S, 23 MD, 38; 296/57, 57 A, 61; 193/5, 17–21

[56] References Cited
UNITED STATES PATENTS 2,554,751  5/1951  Powell...................193/17
2,149,867  3/1939  Pierson..................193/17
2,149,710  3/1939  Smith....................214/42 R Primary Examiner—Robert G. Sheridan
Attorney—Floyd B. Harman

[57] ABSTRACT

A collection bin on a mobile fruit harvester wherein a chute is pivotally mounted on the bin to close a discharge opening when the chute is in an upright position. A latch releasably holds the chute in the closed position. An actuator assembly is mounted on the chute in operative connection with the latch and includes a panel projecting beneath the chute so as to be engageable by a receiving bucket mounted on a vehicle. As the bucket is moved into engagement with the panel, the latch is released and the chute is pivoted to a downwardly inclined position for emptying the contents of the bin into the bucket 2 Claims, 5 Drawing Figures

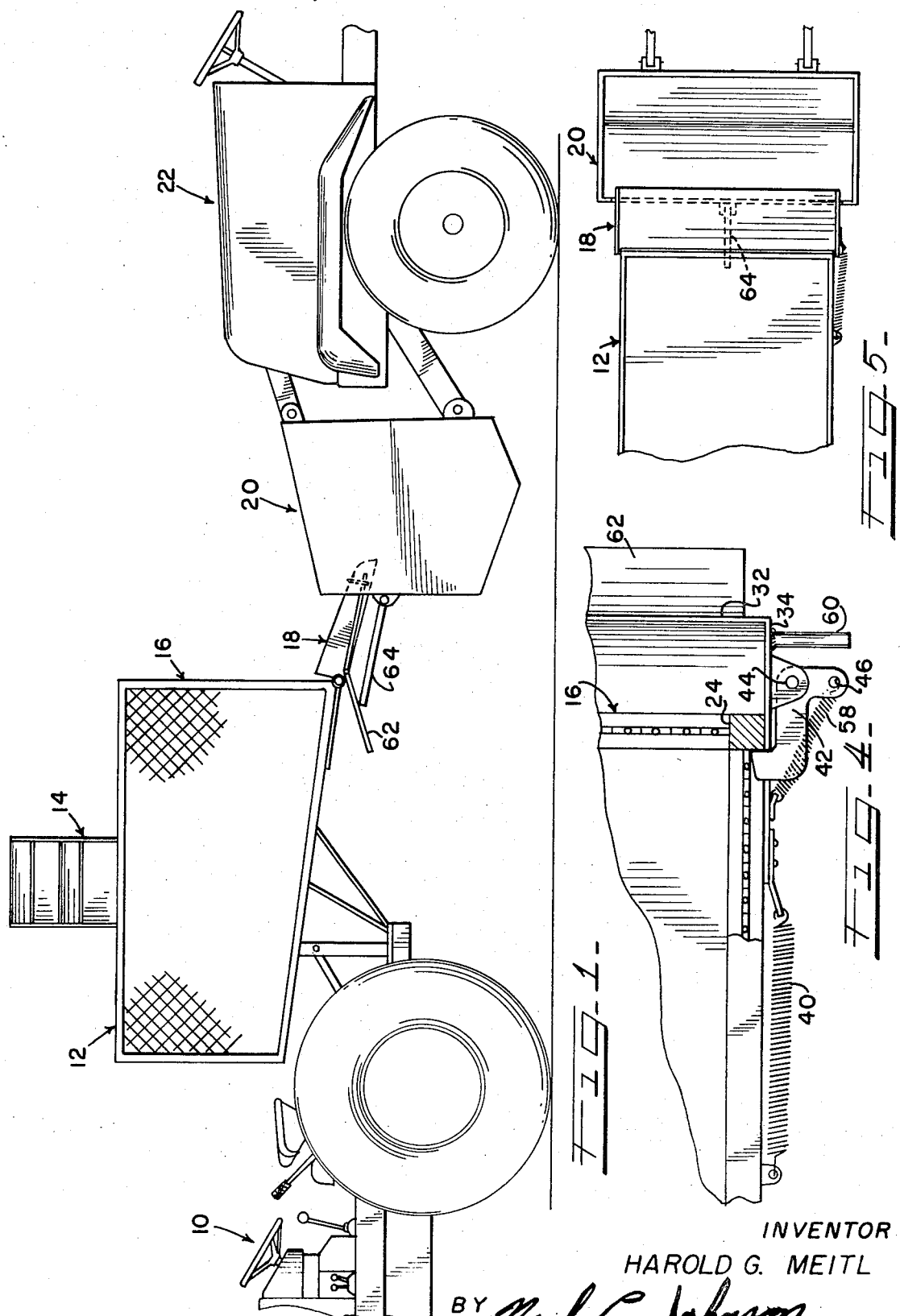

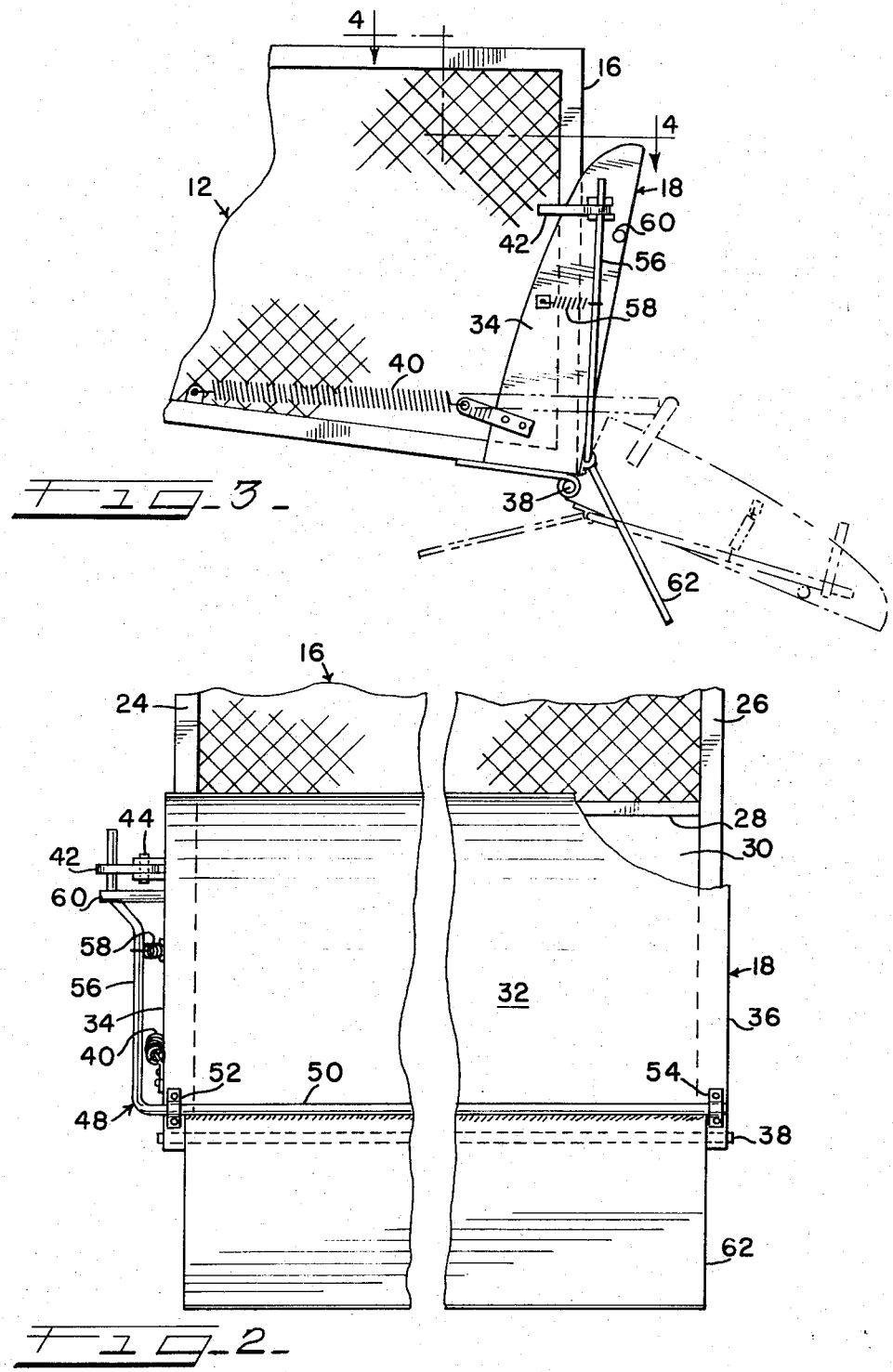

MATERIAL UNLOADING SYSTEM

BACKGROUND OF THE INVENTION

1. Field of the Invention:

The invention relates generally to bulk material unloading and more particularly to structure for closing the discharge opening of a material collection bin, which structure is movable to a position permitting discharge of the material.

2. Prior Art:

Mechanical fruit harvesters have been developed which include means for removing fruit from the trees and collecting the fruit in a bin on the harvester. In typical practice the collection bin is periodically emptied into boxes which are then placed into stacks for loading onto a truck. A considerable amount of manual labor is required in that the discharge system on the bin must be manually operated and the boxes must be manually positioned to receive the fruit from the bin.

SUMMARY

The invention provides an improved collection bin wherein a chute closing a discharge opening in the bin is pivotable to a position permitting discharge of material from the bin along the chute. An actuator mechanism is operatively associated with the chute so as to be adaptable for engagement by a receiver to open the chute for emptying the material into the receiver.

The objects of the invention are: to provide an improved mechanism for quickly and easily unloading material from a collection bin; to provide a closure for a collection bin which closure is pivotable to a position permitting unloading of material from the bin along the closure; to provide the closure with means for locking the same in the closed position; to provide the closure with an actuator mechanism adapted for engagement by a material receiver to open the closure so that the contents of the bin will empty into the receiver; and to provide the closure with means for biasing the same toward its closed position so that it will close in response to completion of the unloading process.

BRIEF DESCRIPTION OF THE DRAWINGS

FIG. 1 is a fragmentary side elevation view of the collection bin for fruit or the like in position to be unloaded into a mobile loader bucket;

FIG. 2 is a fragmentary elevation view of the rear of the collection bin showing structural details of the chute and actuator mechanism;

FIG. 3 is a fragmentary side elevation view of the structure of FIG. 2;

FIG. 4 is a fragmentary sectional view taken generally in the direction of arrows 4—4 of FIG. 3; and, FIG. 5 is a fragmentary plan view of the unloading system of FIG. 1.

DESCRIPTION OF PREFERRED EMBODIMENT

Referring first to FIG. 1, there is shown the rear portion of a tractor 10 adapted to support a fruit harvester. A collection bin 12 is mounted on the tractor 10 for receiving fruit delivered by a conveyor shown partially at 14. The overall relationship of the tractor, fruit harvester, conveyor, and collection bin will be seen in assignee's copending application Ser. No. 867,103 entitled FRUIT CATCHER AND CONVEYOR SYSTEM.

The collection bin 12 is preferably of open-top, metal frame construction with the sides and bottom of wire mesh material. The bottom of the bin 12 slopes rearwardly toward a vertical rear wall 16. As shown generally in FIG. 1, a closure or chute 18 is connected to the lower edge of the rear wall 16 for gravity feeding of fruit into a bucket receiver 20 suitably supported from the forward end of a self-propelled vehicle 22. In practice, the bucket 20 is preferably supported for powered raising and lowering movement from the vehicle 22.

As best shown in FIG. 2, the rear wall 16 of the collection bin 12 includes a pair of vertical frame members 24 and 26 defining the rear corners of the bin. A frame member 28 extends horizontally between the frame members 24 and 26 in spaced parallel relation to the bottom of the bin so as to define a rectangular discharge opening 30.

In accordance with the invention, the chute 18 is mounted on the bin 12 so as to close the discharge opening 30 when in an upright position and to uncover the opening and permit gravity unloading along the chute when pivoted to a downwardly inclined position. The chute 18 is generally U-shaped in form having a rear panel 32 and forwardly disposed side panels 34 and 36 flanking the opposite side walls of the bin. The chute 18 is hinged at its lower edge on a rod 38 disposed along the lower edge of the rear wall 16 so as to be pivotable between the solid line and dotted line positions shown in FIG. 3. An elongated coil spring 40 is connected between the bin 12 and the side panel 34 of the chute for urging the chute into its upright position closing the discharge opening 30.

A latch mechanism is provided for releasably locking the chute 18 in its closed position. As best shown in FIG. 4, a latch hook 42 is pivotably mounted on a pin 44 supported from the side panel 34 for engagement with the forward side of the frame member 24. It will be seen that counterclockwise movement of the latch hook 42 about the pin 44 will swing the hook out of engagement with the frame member 24. For purposes to be described, a vertical opening 46 is defined through a portion of the hook 42 extending outwardly from the pin 44.

Means are provided for sequentially releasing the latch hook 42 and pivoting the chute 18 to its discharge position in response to moving the bucket 20 into a material-receiving position. An L-shaped rod 48 includes a horizontal leg 50 journaled at 52 and 54 on the rear panel 32 of the chute. The rod 48 includes a vertical leg 56 extending upwardly adjacent to the side panel 34 and through the opening 46 in the latch hook 42. A small coil spring 58 is connected between the side panel 34 and the vertical leg 56 for urging the leg 56 forwardly to thus hold the hook 42 in engagement with the frame member 24 as shown in FIG. 4. An abutment member 60 is secured to the side panel 34 of the chute and projects outwardly therefrom in rearwardly spaced relation from the vertical leg 56 of the rod 48. It will be seen that the abutment member 60 will be engaged by the leg 56 as the leg is moved rearwardly.

A rectangular panel 62 is rigidly secured along its upper edge to the horizontal leg 50 of the rod 48. The panel 62 projects downwardly beneath the level of the bottom of the collection bin 12 so as to present a surface engageable by the bucket 20.

As best shown in FIG. 1 the bucket 20 preferably includes an element 64 projecting forwardly for engaging the panel 62.

In operation, the chute 18 is retained in its upright closed position during collection of fruit in the bin 12. The latch hook 42 is releasably retained in engagement with the frame member 24 by means of the spring 58 urging the leg 56 forwardly. When it is desired to empty the bin 12, the vehicle 22 is driven toward the bin and the bucket 20 is raised or lowered to dispose element 64 against panel 62. Continued forward movement of the vehicle 22 causes the element 64 to pivot the panel 62 forwardly about the mountings 52 and 54. This causes the leg 56 to swing rearwardly thereby pivoting the latch hook 42 out of engagement with the frame member 24. The leg 56 then engages the abutment member 60 and the chute 18 is thus pivoted rearwardly about the rod 38 against the force of the spring 40. The fruit is thus free to move through the discharge opening 30, across the chute 18, and into the bucket 20. After the unloading process is completed, the bucket 20 is moved out of engagement with the panel 62. The spring 40 acts to swing the chute 18 back to its closed position wherein the spring 58 urges the latch hook 42 into engagement with the frame member 24.

From the foregoing, it will be apparent that the invention provides a simple and expedient means for unloading material from a bin.

What is claimed is:

1. In a material-collection bin having a wall through which an opening is defined for discharge of material from the bin, wherein the improvement comprises:
    a discharge chute pivotally mounted on said bin for movement about a horizontal pivot axis between a generally vertically disposed position closing said opening and a downwardly inclined position permitting discharge of material through said opening along said chute;
    spring means interconnecting said chute and said bin for biasing said chute into its closed position;
    a latch pivotally mounted on said chute for releasably engaging said bin to hold said chute in its closed position;
    a panel pivotally mounted at its upper edge on said chute and projecting downwardly therefrom;
    a rod fixed on said panel and extending upwardly therefrom in operative connection with said latch, whereby said latch is released from connection with said bin in response to pivotal movement of said panel to thereby free said chute for movement to its discharge position.

2. The subject matter of claim 1, including an abutment member on said chute engageable by said rod upon release of said latch whereby said chute is pivoted to its discharge position in response to pivotal movement of said panel.

* * * * *